United States Patent [19]
Neff

[11] 4,193,166
[45] Mar. 18, 1980

[54] KNOB FOR A PAN COVER
[75] Inventor: Paul C. Neff, Antioch, Ill.
[73] Assignee: Northwest Molded Products Corporation, Waukegan, Ill.
[21] Appl. No.: 931,935
[22] Filed: Aug. 7, 1978
[51] Int. Cl.² .................................... A47B 95/02
[52] U.S. Cl. .................................... 16/121; 292/347
[58] Field of Search ............... 16/121, 118, 114 R, 16/114 A, 110 R, 110 A, 124; 292/347; 137/533, 533.17

[56] References Cited
U.S. PATENT DOCUMENTS

| 700,864 | 5/1902 | Weinberg | 116/70 |
| 716,568 | 12/1902 | Moore | 116/70 |
| 777,538 | 12/1904 | Puckett | 116/70 |
| 875,310 | 12/1907 | Ayer | 126/388 |
| 957,663 | 5/1910 | Emslie | 116/70 |
| 999,567 | 8/1911 | Kallstrom | 116/70 |
| 2,586,759 | 2/1952 | Zimmer | 16/118 X |
| 3,277,830 | 10/1966 | Kalert et al. | 137/533 X |
| 3,459,218 | 8/1969 | Cranage | 137/557 |
| 4,134,358 | 1/1979 | Heermans | 116/70 |

FOREIGN PATENT DOCUMENTS 493896   5/1954   Italy ......................................... 137/533

Primary Examiner—George H. Krizmanich
Attorney, Agent, or Firm—Kinzer, Plyer, Dorn & McEachran

[57] ABSTRACT

A knob for the cover of a pan or similar container which is used for waterless cooking. The knob is installed in an opening formed in the pan cover. A vent passage extends from the pan cover opening to an outlet in the lower peripheral portion of the knob. A disc is provided for closing the vent passage and a slidable tubular housing is provided with lifting surfaces to lift the disc and open the vent passage. The knob can be partially disassembled for cleaning by rotation of the outer tubular housing.

5 Claims, 6 Drawing Figures

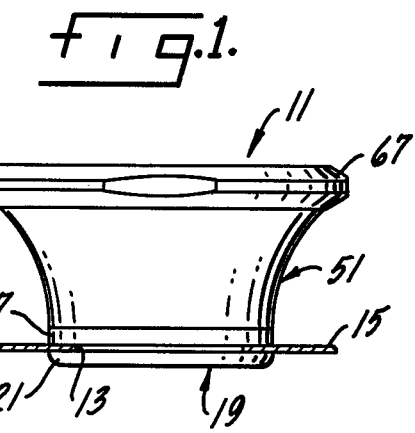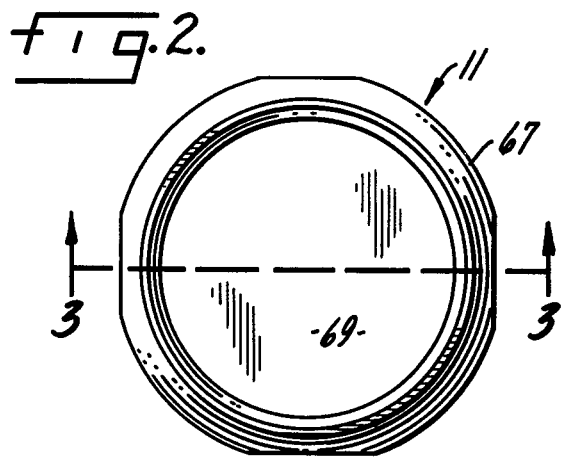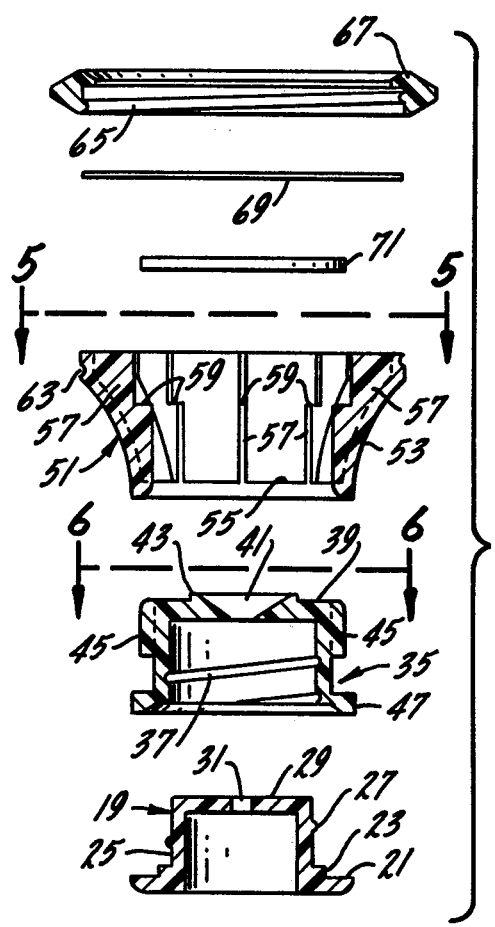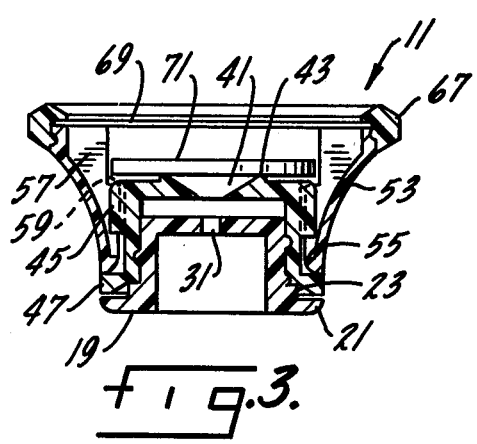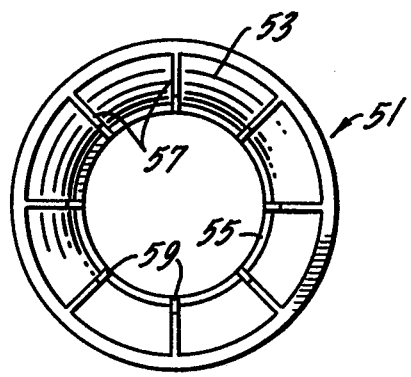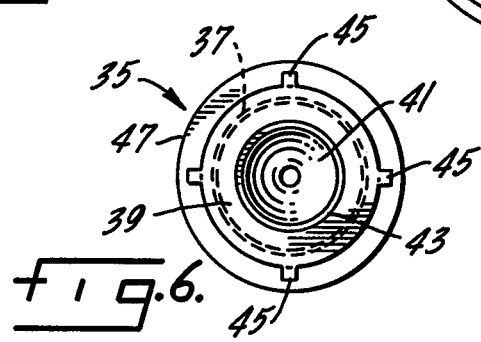

4,193,166

KNOB FOR A PAN COVER

BACKGROUND AND SUMMARY OF THE INVENTION

The so-called waterless cooking method involves the cooking of food, particularly vegetables, using relatively small amounts of water. This method preserves the nutrients of the food by using lower temperatures and also conserves energy. For example, frozen food can be cooked from its frozen state without the addition of water other than the water which is already frozen in. Other types of food will require small amounts of water, for example, as little as one tablespoon. The waterless cooking method requires a covered pan or container in which the cover is equipped with a device that indicates when the water starts to boil. When this occurs, the container outlet should be closed and the heat should be reduced to its lowest value thereby creating a vacuum in the container. The creation of a vacuum permits the food to cook properly at lower temperatures.

One type of waterless cookware presently on the market have pan covers with closable vent systems. The vent system is built in the cover knob and includes a whistle which indicates when the water is boiling. The vent can be closed to create a vacuum in the cooking pan. The cover knob includes a tubular base which is installed in a pan cover opening and has a flange at its lower end which engages the undersurface of the cover. An opening is provided in a wall at the upper end of the tubular base and a thread is formed on the exterior of the tubular base. A tubular upper portion telescopes over the tubular base and it has an internal thread which engages the external thread of the base. A vent passage outlet is formed in a wall at the top of the upper tubular portion. An annular housing fits over the telescoped tubular portions and this housing has a vent opening in the top thereof and a slidable plate to close the vent passage outlet of the upper tubular portion.

The vent knob described above has presented several problems in manufacture and use which the knob of this invention is intended to correct. First, the knob presently on the market is expensive to manufacture. One reason for its high cost of manufacture is that it is held together by metal screws which increase its complexity and thus its cost of manufacture and assembly. Secondly, the slidable plate which shuts off the vent passage requires integral plastic resilient tabs for sealing. This means the slide plate must be manufactured to close and expensive tolerances. Thirdly, the vent opening is located in the top of the knob and presents the danger of scalding to the user since any steam generated by the boiling water is discharged at the top of the knob, where it can contact the hand of the cook.

In contrast, the knob of this invention has none of the foregoing deficiencies. The knob of this invention is less expensive to mold and assemble than the previously discussed knob since no fasteners are required for its assembly. Secondly, since the vent opening of the knob of this invention is closed by gravity movement of a disc, resilient tabs for the closure member are not required. Thirdly, any steam generated during this boiling of the water is discharged near the base of the knob where it is less likely to cause injury to the cook.

Additionally, the knob of this invention will automatically re-open the vent if the heat is not properly reduced after the vent is closed and will indicate the reopening of the vent by a whistling sound.

These advantages and others will be found in the following specification, claims and drawings.

BRIEF DESCRIPTION OF THE DRAWINGS

The invention is illustrated more or less diagrammatically in the following drawings wherein:

FIG. 1 is a side elevational view of the knob of this invention mounted on a pan cover which is shown in cross-section and is partially broken away;

FIG. 2 is top plan view of the knob of FIG. 1 with the pan cover omitted for clarity of illustration;

FIG. 3 is a cross-sectional view taken along line 3—3 of FIG. 2 and showing the knob in its vent closed position;

FIG. 4 is an exploded view of the knob of FIG. 1;

FIG. 5 is a top plan view taken along line 5—5 of FIG. 4; and

FIG. 6 is a top plan view taken along line 6—6 of FIG. 4.

DESCRIPTION OF THE PREFERRED EMBODIMENT

FIG. 1 of the drawings shows a knob 11 of this invention installed in an opening 13 of a pan cover 15. The knob is injected molded in several parts most of which may be formed of Nylon 66 or any other suitable Food and Drug Administration approved plastic. The disc which closes the vent may be formed from stainless steel, aluminum or Nylon 66.

The knob 11 includes a tubular base 19 which is installed in the opening 13 of the pan cover 15. The tubular base 19 has a bottom flange 21 which engages the undersurface of the pan cover 15 as shown in FIG. 1. A hexagonal shaped flange 23 is positioned between the bottom flange and the tubular wall 25 of the tubular base. The hexagonal flange tightly fits in the opening 13 of the pan cover to prevent rotation of the tubular base 19 relative thereto.

A thread 27 is formed on the exterior of the tubular wall 25 of the tubular base. The lower end of the tubular base is open and the upper end is closed by a wall 29 having a cylindrical passage 31 formed therein. A tubular upper member 35 telescopes over the tubular base 19 and is fastened thereto by engagement of an interior thread 37 thereon with the exterior thread 27 of the tubular base. The tubular upper member is open at its lower end and its top is closed by a wall 39 having an outwardly diverging outlet opening 41 formed therein. A slightly raised annular wall 43 is formed on the end wall 39 and it surrounds the outlet opening 41.

Longitudinally extending ribs 45 are formed on the exterior wall of the tubular upper member 35 and are spaced around the periphery thereof. In this embodiment, four ribs are provided, each located 90° apart with the ribs extending less than the axial length of the tubular upper member. A flange 47 is located at the lower end of the tubular upper member and, when installed, engages the upper surface of the pan cover 15 as shown in FIG. 1.

A tubular housing 51 of inverted frusto-conical shape telescopes over the tubular upper member 35 of the knob as depicted in FIG. 3. The tubular housing includes an outer wall 53 which terminates at its lower end in an inwardly projecting flange 55. This flange extends inwardly of the ribs 45 of the tubular upper member 35 as shown in FIG. 3 to prevent these parts from separating. Inwardly projecting ribs 57 are integrally formed as part of the housing 51 and are uniformly spaced around the inner periphery of the wall 53. In this embodiment of the invention, there are eight ribs 57, each spaced 45° apart. The ribs are notched to provide lifting surfaces 59 located in a common plane.

A thread 63 is formed on the outer surface of the outer wall 53 of the tubular housing 51 near the top thereof. This thread engages an internal thread 65 of a ring 67 which fits over the upper end of the tubular housing to hold a disc 69 in position. The disc 69 may be formed of aluminum or plastic and receives indicia which may contain the name or trademark of the seller of the knob and/or instructions for use of the knob.

A second disc 71 is positioned inside the tubular housing 51 and rests on the annular wall 43 surrounding the outlet 41 of the tubular upper member 35 to seal the passage through the knob. The disc 71 has sufficient diameter that it can be engaged and lifted by the lifting surfaces 59 of the tubular housing 51.

The use, operation and function of this invention are as follows:

FIG. 4 of the drawings shows an exploded view of the knob 11 of this invention. It is installed on a pan cover or other cover 15 for a food container by inserting the tubular base 19 into an opening 13 formed in the cover. The hexagonal flange 23 extends into the opening and engages the walls thereof to prevent the tubular base 19 of the knob from rotating relative to the cover. As part of the installation, the tubular housing 51 is snap-fitted over the tubular upper member 35 of the knob by forcing the lower flange 55 over the external ribs 45 of the tubular upper member 35. There is sufficient flexibility in the tubular housing 51 to force the flange 55 over the ribs 45. The flange 55 will then extend inwardly of the ribs 45 preventing removal of the tubular housing from the member 35. The vent closure disc 71 may be inserted into the housing 51 either before or after the housing is assembled on the tubular member 35. The ring 67 and its disc 69 may then be threaded onto the tubular housing 51. The vent closure disc 71 will be free to move axially in the housing 51 resting on the lifting surfaces 59.

The assembled tubular housing 51 and the tubular upper member 35 may then be screw threaded onto the tubular base 19 by engaging the thread 37 of the tubular upper member 35 with the thread 27 of the tubular base.

When the cover 15 is placed on a cooking pan or other utensil at the start of a cooking cycle, the outer tubular housing 51 of the knob 11 is slid to its upmost or raised position where its lower flange 55 engages the bottoms of the ribs 45 of the member 35. The lifting surfaces 59 of the ribs 57 engage the disc 71 lifting it off the annular wall 43 surrounding the outlet 41 in the tubular upper member 35 thereby permitting the passage of heated air or steam from the cooking pan through the knob 11. With the vent passage of the knob opened, heating of the water in the pan will produce heated air or steam which will flow through outlet 41 in the tubular member 35, downwardly between the ribs 45 of the tubular member 35 and the wall 53 of the tubular housing 51 and out beneath the flange 55 of the outer tubular housing 51. The passage of the heated air or steam through the outlet 41 will create a whistling effect which indicates to the cook that it is time to close the vent passage through the knob. This is accomplished by pushing the outer tubular housing 51 downwardly to move the disc 71 into sealing contact with the annular wall 43 surrounding the outlet passage 41. At the same time, the cook reduces the heat under the cooking utensil to its lowest possible level, thereby reducing the temperature in the utensil and creating a partial vacuum therein. The partial vacuum pulls the disc 71 tighter on the annular wall 43 thus aiding in the maintenance of a partial vacuum in the cooking utensil.

In the event that the cook fails to lower the heat sufficiently, the continued generation of heated air or steam will lift the disc 41 off the annular wall 43 allowing heated air and steam to escape through the passage 41 continuing the whistling. This will indicate to the cook that the temperature has not been reduced to its proper level.

The knob 11 can be partially disassembled for cleaning by rotating the tubular housing 51 in a counterclockwise direction as viewed in FIG. 2. The ribs 57 of the tubular housing 51 will engage the ribs 45 of the tubular upper member 35 causing it to unthread from the tubular base 19. The tubular base 19 will remain connected to the cover 15 because of the seating of its hexagonal shaped flange 23 in the opening 13. This construction permits the removal of the tubular housing 51 and its assembled tubular upper member 35 from the tubular base 19 for cleaning purposes. The disc 71 can be removed for cleaning or replacement simply be removal of the ring 67 and its disc 69.

Whereas, the preferred form of the invention has been shown and described, it should be understood that modifications and changes can be made without departing from the spirit of the invention. Therefore, the invention should be limited only by a liberal interpretation of the claims which are appended hereto.

I claim:

1. A knob for the cover of a pan used for waterless cooking, including:
   means for mounting said knob in an opening formed in the pan cover,
   a vent passage outlet,
   a vent passage extending through said mounting means and connecting said pan cover opening with said vent passage outlet,
   means to selectively open and close said vent passage outlet which means includes:
   a disc for closing said vent passage outlet, and
   means to lift said disc from said vent passage outlet to open said outlet.

2. The knob of claim 1 in which said means to lift said disc includes a tubular housing encircling said mounting means and slidable axially relative thereto with said tubular housing having lifting surfaces which engage said disc.

3. The knob of claim 1 in which said means for mounting said knob in an opening in said pan cover includes:
   a tubular base extending through said opening,
   said base having a flange at the lower end thereof which engages the undersurface of the cover,
   an opening at the upper end of the tubular base and a thread on the exterior thereof intermediate the ends thereof,
   a tubular upper portion which telescopes over said tubular base and has an internal thread which engages the thread of said base,
   said vent passage outlet being formed in the top of said upper portion, and a disc seat surrounding tubular vent passage outlet and located on the top of said tubular upper portion.

4. The knob of claim 3 in which axially extending ribs are formed on the outer surface of the tubular upper portion and are positioned around the periphery thereof and radially inwardly projecting ribs are formed on said tubular housing with said housing ribs being engageable with said tubular upper portions ribs to rotate said tubular upper portion of said mounting means relative to said tubular base portion.

5. The knob of claim 1 in which said tubular housing is sealed at the top and has an outlet opening at the lower periphery thereof which connects with the vent passage outlet.

* * * * *